United States Patent
Cheng et al.

(10) Patent No.: US 10,333,455 B2
(45) Date of Patent: Jun. 25, 2019

(54) SYSTEM AND METHOD FOR CONSISTENT SPEED REGULATION IN A VARIABLE FREQUENCY DRIVE

(71) Applicant: Eaton Corporation, Cleveland, OH (US)

(72) Inventors: Xiaomeng Cheng, Shanghai (CN); Huaqiang Li, Menomonee Falls, MI (US); Peijun Zhu, Shanghai (CN); Dongxiao Wu, Shanghai (CN); Kayle Wang, Shanghai (CN); Qian Zhang, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 181 days.

(21) Appl. No.: 15/085,446

(22) Filed: Mar. 30, 2016

(65) Prior Publication Data
US 2017/0288598 A1 Oct. 5, 2017

(51) Int. Cl.
*H02P 29/10* (2016.01)
*H02P 27/08* (2006.01)
(Continued)

(52) U.S. Cl.
CPC .............. *H02P 29/10* (2016.02); *G05B 19/00* (2013.01); *H02P 6/08* (2013.01); *H02P 27/08* (2013.01)

(58) Field of Classification Search
CPC .......... H02P 27/08; H02P 27/06; H02P 23/08; H02M 7/53875; Y02T 10/7005
(Continued)

(56) References Cited

U.S. PATENT DOCUMENTS

2008/0224649 A1* 9/2008 Bae .................. H02P 21/22
318/801
2008/0300103 A1 12/2008 DeMarco et al.
(Continued)

FOREIGN PATENT DOCUMENTS

KR 100872985 B1 12/2008

OTHER PUBLICATIONS

Yan et al., "Theory and Application of a Combined Feedback-Feedfoward Control and Disturbance Observer in Linear Motor Drive Wire-EDM Machines," International Journal of Machine Tools & Manufacture, Oct. 5, 2007, vol. 48, No. 3-4, pp. 388-401.
(Continued)

*Primary Examiner* — Shawki S Ismail
*Assistant Examiner* — Bradley R Brown
(74) *Attorney, Agent, or Firm* — Ziolkowski Patent Solutions Group, SC (57) ABSTRACT

A system and method for speed regulation of a VFD circuit via an anti-windup control scheme that provides consistent speed response with no overshoot is disclosed. A control system for operating the VFD circuit includes a feedback controller programmed to receive a speed of a motor operating responsive to an initial torque command and process the speed of the motor to generate a feedback controller output. A feedforward controller of the control system is programmed to process a speed reference to generate a feedforward controller output. A command module of the control system is programmed to determine a torque command based on the processed outputs of the feedback and feedforward controllers and operate the VFD circuit to control the motor according to the torque command.

20 Claims, 7 Drawing Sheets

(51) Int. Cl.
*G05B 19/00* (2006.01)
*H02P 6/08* (2016.01)

(58) Field of Classification Search
USPC .......................................................... 318/801
See application file for complete search history.

(56) References Cited

U.S. PATENT DOCUMENTS

| 2013/0307447 | A1* | 11/2013 | Rozman | G05B 11/01 |
| | | | | 318/400.02 |
| 2014/0028224 | A1* | 1/2014 | Arima | H02P 21/0096 |
| | | | | 318/400.02 |
| 2014/0225548 | A1* | 8/2014 | Xu | H02P 6/183 |
| | | | | 318/400.33 |
| 2016/0344326 | A1* | 11/2016 | Fujiwara | H02P 21/14 |

OTHER PUBLICATIONS

Kosaka et al., "Anti-Windup Using Switch for SISO System," Journal of Low Frequency Noise, Vibration and Active Control, Jun. 1, 2007, vol. 26, No. 3, pp. 205-215.

* cited by examiner

SYSTEM AND METHOD FOR CONSISTENT SPEED REGULATION IN A VARIABLE FREQUENCY DRIVE

BACKGROUND OF THE INVENTION

The present invention relates generally to variable frequency drive (VFD) circuits and, more particularly, to a system and method for speed regulation for VFD circuits where an anti-windup control scheme is employed that provides consistent speed response with no overshoot.

One type of system commonly used in industry that performs power conversion is an adjustable or variable frequency drive circuit, which is an industrial control device that provides for variable frequency, variable voltage operation of a driven system, such as an AC induction motor. VFDs include both an AC-to-DC converter and a DC-to-AC inverter, which includes a plurality of switches that are controlled to provide the variable output of the VFD circuits. VFD circuit DC-to-AC inverters are often controlled by proportional-integral (PI) controllers, proportional-integral-derivative (PID) controllers, and the like. However, when such controllers with integrating action are used, a windup phenomenon appears that degrades control performance of the VFD.

The windup phenomenon is caused by the interaction of the integral term of a controller controlling the VFD and the saturation of a motor being controlled by the VFD. The physical limitations of the motor do not allow the motor to reach its ideal speed as determined by the controller. When the motor reaches its maximum speed, the controller feedback loop breaks. The system then runs as an open loop because the motor will remain at its maximum speed independently of the output of the controller. However, the integral term of the controller will continue to integrate the error between the controller output and the motor speed and "wind up" to a large value. This windup phenomenon can cause large overshoot, slow settling time, and instability in the speed response of a motor.

Figure 1:
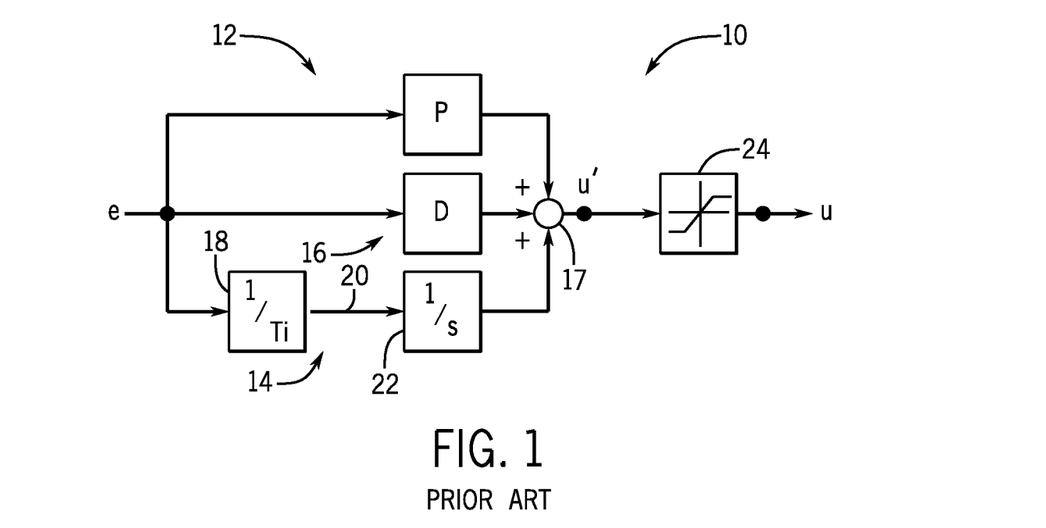
FIG. 1 is a block diagram of a PID controller without anti-windup control, as known in the prior art.

FIG. 1 illustrates a block diagram of a PID controller 10 in which the windup phenomenon could occur. PID controller 10 transforms a speed error signal, e, into a PID controller output, u', by inputting the speed error signal, e, into a proportional term 12, an integral term 14, and a derivative term 16 and adding the results of the proportional, integral, and derivative actions together in a summation block 17. The proportional term is represented by proportional block, P, and the derivative term is represented by derivative block, D. In the integral term 14, the speed error signal, e, is input into an integral time block 18 to create an integral speed error signal 20, which is integrated by an integrator block 22. The PID controller output, u', is transformed into a torque command, u, by inputting the PID controller output, u', into a saturation block 24 to impose upper and lower limits on the PID controller output, u', according to the limitations of a motor (not shown) being controlled by a VFD (not shown) associated with PID controller 10. PID controller 10 does not, however, include any anti-windup controls to prevent the windup phenomenon, so PID controller 10 may become unstable.

Figure 2:
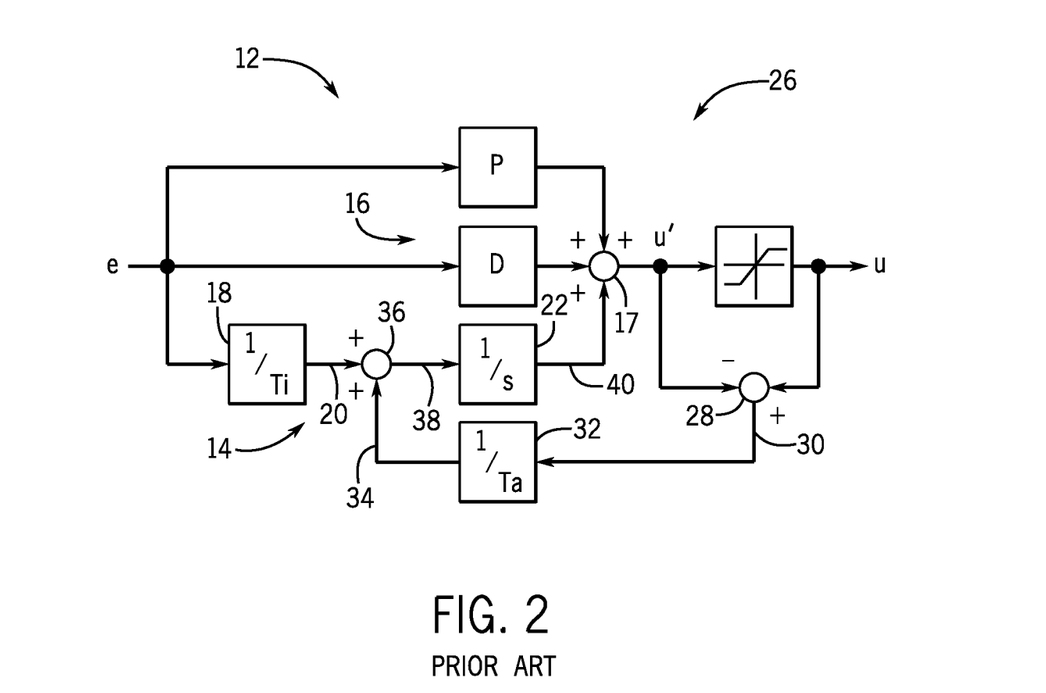
FIG. 2 is a block diagram of a PID controller with anti-windup control, as known in the prior art.

Those of skill in the art have developed anti-windup controls for preventing the windup phenomenon from occurring in VFD controllers. FIG. 2 illustrates a conventional anti-windup PID controller 26. The PID controller 26 includes the same components and operates in the same manner as PID controller 10 (FIG. 1), except for the additional anti-windup controls. The PID controller 26 uses a tracking-back anti-windup method such that the PID controller 26 adds the negative value of the PID controller output, u', to the torque command, u, in a summation block 28 to create an output error signal 30. The output error signal 30 is multiplied by a tracking time gain 32 to create a tracking-back signal 34. The tracking-back signal 34 is then added to the integral speed error signal 20 in summation block 26 to create a tracking-back integral signal 38 that is integrated by the integrator block 22 to create an integral term output 40.

The integral term output 40 tracks the saturated voltage of the VFD while the PID controller output, u', does not equal the torque command, u (during the saturation period of PID controller 26). The PID controller output, u', will converge to the steady-state value of the load torque on the motor when the torque command, u, is no longer saturated. However, the tracking-back anti-windup method still does not provide optimal performance for VFD controllers. More specifically, the convergence period associated with the tracking-back anti-windup method still leads to overshoot and/or slow response times that result in performance degradation.

It would therefore be desirable to provide a system and method for speed regulation for VFD circuits that provides a consistent speed response with no overshoot.

BRIEF DESCRIPTION OF THE INVENTION

Embodiments of the present invention provide a system and method for speed regulation for VFD circuits with a consistent speed response and no overshoot.

In accordance with one aspect of the invention, a control system for operating a VFD circuit that controls a motor includes a feedback controller programmed to receive a speed of the motor operating responsive to an initial torque command and process the speed of the motor to generate a feedback controller output, a feedforward controller programmed to process a speed reference to generate a feedforward controller output, and a command module programmed to determine a torque command based on the processed outputs of the feedback and feedforward controllers and operate the VFD circuit to control the motor according to the torque command.

In accordance with another aspect of the invention, a method of controlling a VFD circuit via a control system comprising a feedforward controller and a feedback controller is provided. The method includes measuring or estimating a motor speed of a motor being controlled by the VFD circuit according to an introductory torque command, providing an input to the feedback controller comprising the motor speed, introducing a speed reference input in the feedforward controller, modifying the motor speed input in the feedback controller to generate a modified feedback controller output, modifying the speed reference input in the feedforward controller to generate a modified feedforward controller output, calculating an updated torque command based on the modified outputs of the feedback and feedforward controllers, and controlling the VFD circuit to supply power to the motor based on the torque command.

In accordance with yet another aspect of the invention, a regulator for controlling the output of a VFD circuit is programmed to sense or estimate a motor speed of a motor driven by the VFD circuit according to an initial torque command, receive a speed reference value, filter the speed reference value, manipulate the motor speed in a feedback controller according to the filtered speed reference value, manipulate the speed reference value in a feedforward controller according to the filtered speed reference value, determine a modified torque command value according to the manipulated motor speed and manipulated speed reference value, and control the VFD circuit to drive the motor in conformance with the modified torque command value.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to a system and method for regulating the speed of a motor controlled by a VFD circuit so that the motor has a consistent speed response and does not overshoot its target speed. Embodiments of the system and method disclosed differ from prior art systems by combining a feedforward controller and a feedback controller including an observer in a regulator or control system. The regulator uses the observer to estimate future operational values of the motor and compare those values with desired and actual operational values of the motor. The regulator produces a command for controlling the VFD to operate the motor while preventing anti-windup.

Figure 3:
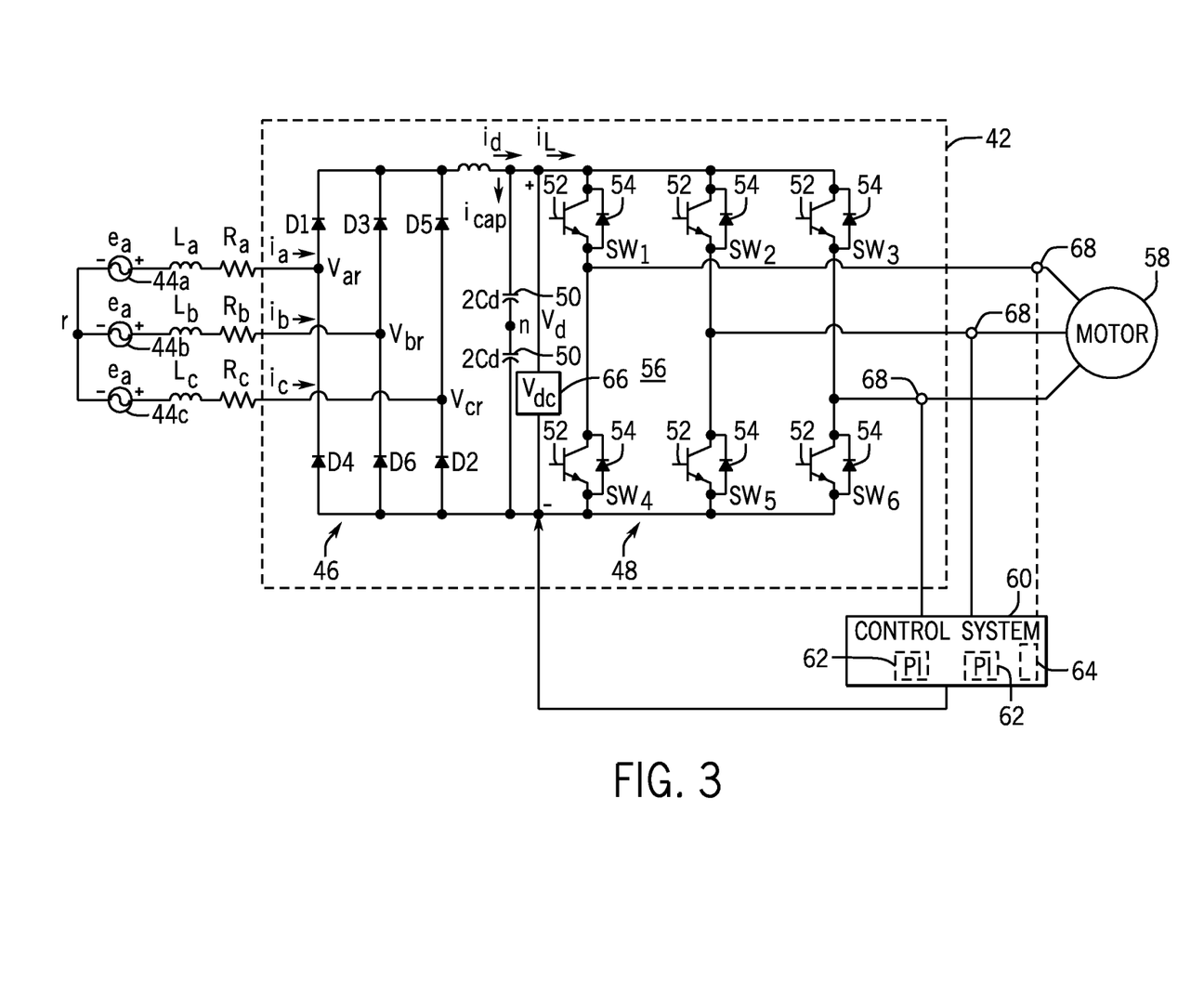
FIG. 3 is a schematic of an AC motor drive and associated induction motor for use with embodiments of the invention.

Referring to FIG. 3, the general structure of a drive system 42 configured to control operation of an associated AC induction machine (e.g., AC motor) is shown that is useable with embodiments of the invention. The drive system 42 is configured as a VFD circuit designed to receive a three-phase AC power input, rectify the AC input, and perform a DC/AC conversion of the rectified segment into a three-phase alternating voltage of variable frequency and amplitude that is supplied to a load. In a preferred embodiment, the VFD operates according to an exemplary volts-per-hertz characteristic. In this regard, the motor drive provides voltage regulation of ±1% in steady state with less than 3% total harmonic distortion, ±0.1 Hz in output frequency, and fast dynamic step load response over a full load range. Also in a preferred embodiment, the VFD provides control according to a vector or field-oriented control scheme.

In an exemplary embodiment, a three-phase AC power input 44a-44c is fed to a three-phase rectifier bridge 46. The input line impedances are equal in all three phases. The rectifier bridge 46 converts the AC power input 44a-44c to a DC power such that a DC bus voltage is present between the rectifier bridge 46 and a switch array 48. The bus voltage is smoothed by a DC bus capacitor bank 50. The switch array 48 is comprised of a series of IGBT switches 52 and anti-parallel diodes 54 that collectively form a PWM inverter 56. The PWM inverter 56 synthesizes AC voltage waveforms with a variable frequency and amplitude for delivery to a load, such as an induction motor 58.

The inverter 56 operates via a control system 60, which may further be comprised of one or more PI or PID controllers 62 and other associated processors 64 that perform high speed operations such as space-vector modulation, DC bus voltage decoupling, and protection, for example. The control system 60 interfaces with the PWM inverter 56 via gate drive signals and sensing of the DC bus voltage and pole currents (by way a voltage sensor 66 and current sensors 68, for example). Changes in the DC bus voltage can be sensed and interpreted as transient load conditions and are used to control switching of the switch array 48 of PWM inverter 56 such that near steady-state load conditions are maintained.

Figure 4:
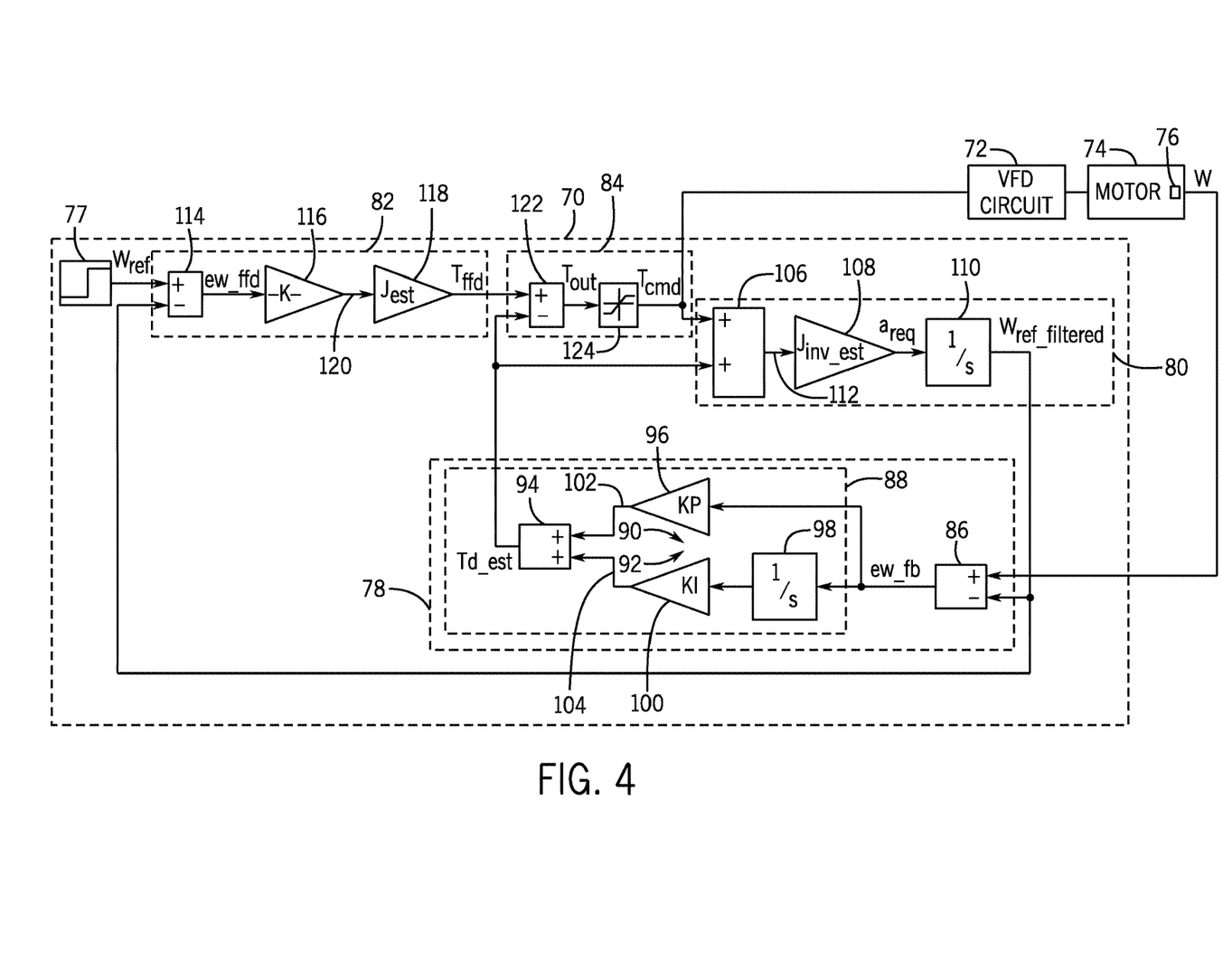
FIG. 4 is a block diagram of a regulator, according to an embodiment of the invention.

Referring now to FIG. 4, a block diagram of a regulator or control system 70 is shown (such as might be incorporated into the controller 60 of FIG. 3 or provided as a separate regulator/control system in operable communication with the drive system 42 and PWM inverter 56 of FIG. 3) according to an embodiment of the invention. The regulator 70 is configured or programmed to control or operate a VFD circuit 72 that drives or operates a motor 74. The VFD circuit 72 drives the motor 74 by supplying power to the motor 74 according to a torque command, $T_{cmd}$, that is continuously updated or modified by the regulator 70. The regulator 70 calculates the torque command, $T_{cmd}$, based on an actual speed, w, of the motor 74 that, according to one embodiment, is measured by a sensor 76 on the motor 74 and based on a speed setpoint or reference (value or signal), $w_{ref}$, generated by a signal generator 77. In an alternative embodiment, the actual motor speed, w, may be estimated by the regulator 70 to save the cost of using the sensor 76. The actual motor speed, w, is input into a feedback controller 78 along with a filtered speed reference or setpoint (value or signal), $w_{ref\_filtered}$, of the motor 74. The filtered speed reference, $w_{ref\_filtered}$, is calculated by an observer 80 and corresponds to the speed reference, $w_{ref}$, after it has been filtered by a feedforward controller 82, a (torque) command controller or module 84, and the observer 80.

The feedback controller 78 includes a summation block 86 and a PI controller 88. The PI controller 88 includes a proportional term 90, an integral term 92, and a summation block 94. The proportional term 90 includes a gain block 96 having a proportional gain, KP. The integral term 92 includes an integrator block 98 and a gain block 100 having an integral gain, KI. Upon being input into the feedback controller 78, the actual motor speed, w, is compared with the filtered speed reference, $w_{ref\_filtered}$, in the summation block 86. The filtered speed reference, $w_{ref\_filtered}$, is subtracted from the actual motor speed, w, creating a feedback speed error value or signal, $e_{w\_fb}$.

The feedback speed error signal, $e_{w\_fb}$, is input into the PI controller 88 and is processed or modified by the proportional term 90 and the integral term 92. The processed or modified outputs 102, 104 of the proportional and integral terms 90, 92, respectively are input into summation block 94. The processed outputs are summed together to produce an estimated torque load value or signal, $T_{d\_est}$, of the motor 74. The estimated motor torque load value, $T_{d\_est}$, is the output of the feedback controller 78 and is input into the observer 80 along with the torque command, $T_{cmd}$.

The observer 80 includes a summation block 106, a gain block 108 having a gain equal to an estimated value of the inverse of the moment of inertia, $J_{inv\_est}$, of the motor 74, and an integrator block 110. The estimated value of the inverse of the moment of inertia, $J_{inv\_est}$, is pre-determined by a user and does not need to be updated with changing values of the actual motor speed, w. The summation block 106 sums together the estimated motor torque load value, $T_{d\_est}$, and the torque command, $T_{cmd}$. The output 112 of the summation block 106 is converted from a torque value into a required acceleration, $a_{req}$, after the output 112 is multiplied by the estimated value of the inverse of the motor moment of inertia, $J_{inv\_est}$, in gain block 108. The required acceleration, $a_{req}$, is integrated by the integrator block 110 to obtain the filtered speed reference, $w_{ref\_filtered}$.

The estimated motor torque load value, $T_{d\_est}$, is also input into the command module 84 along with a feedforward torque value or signal, $T_{ffd}$, calculated by the feedforward controller 82. The feedforward controller 82 calculates the torque feedforward value or signal, $T_{ffd}$, from the speed reference, $w_{ref}$, received from the signal generator 77 and from the filtered speed reference, $w_{ref\_filtered}$, received from the observer 80. The feedforward controller 82 includes a summation block 114, a gain block 116, and a gain block 118 having a gain equal to an estimated value of the moment of inertia, $J_{est}$, of the motor 74. The gain block 116 represents a low-pass filter having a low-pass filter gain, K.

Upon being input into the feedforward controller 82, the speed reference, $w_{ref}$, is compared with the filtered speed reference, $w_{ref\_filtered}$, in the summation block 114. The filtered reference speed, $w_{ref\_filtered}$, is subtracted from the speed reference, $w_{ref}$, creating a feedforward speed error value or signal, $e_{w\_ffd}$. The feedforward speed error value or signal, $e_{w\_ffd}$, is passed through the low-pass filter represented by gain block 116. The output 120 of gain block 116 is multiplied by the estimated value of the motor moment of inertia, $J_{est}$, in gain block 118. The output of gain block 118 (and of the feedforward controller 82) is the torque feedforward value, $T_{ffd}$.

As stated above, the command module 84, which computes the torque command, $T_{cmd}$, receives the torque feedforward value, $T_{ffd}$, and the estimated motor torque load value, $T_{d\_est}$, as inputs. The command module 84 includes a summation block 122 and a saturation block 124. Upon being input into the command module 84, the torque feedforward value, $T_{ffd}$, is compared with the estimated motor torque load value, $T_{d\_est}$, in the summation block 122. The estimated motor torque load value, $T_{d\_est}$, is subtracted from the torque feedforward value, $T_{ffd}$, to create a torque output, $T_{out}$. The torque output, $T_{out}$, is input into the saturation block 124. The saturation block 124 creates the torque command, $T_{cmd}$, by limiting the torque output, $T_{out}$, according to limitations of the motor, such as maximum speed, for example.

In summary, the operation of the regulator 70 starts with the input of the measured or estimated motor speed, w, and the introduction of the speed reference, $w_{ref}$. The motor speed, w, and the filtered speed reference, $w_{ref\_filter}$, are input into the feedback controller 78, which calculates the estimated motor torque load, $T_{est}$. The speed reference, $w_{ref}$, and the filtered speed reference, $w_{ref\_filter}$, are input into the feedforward controller 82, which calculates the torque feedforward value, $T_{ffd}$. The torque feedforward value, $T_{ffd}$, and the estimated motor torque load, $T_{d\_est}$, are input into the command module 84, which calculates the torque command, $T_{cmd}$. The torque command, $T_{cmd}$, and the estimated motor torque load, $T_{d\_est}$, are input into the observer 80, which calculates the filtered speed reference, $w_{ref\_filtered}$. The filtered speed reference, $w_{ref\_filtered}$ is used to calculate the torque command, $T_{cmd}$, and also depends on the torque command, $T_{cmd}$. Therefore, the filtered speed reference, $w_{ref\_filtered}$, depends on a past or initial/introductory torque command, $T_{cmd\_initial}$, in order to calculate a future or modified torque command, $T_{cmd\_modified}$.

Using the anti-windup method of the regulator 70, the control performance of the VFD circuit 72 is improved. The speed response of the motor 74 becomes consistent and the motor speed, w, does not overshoot the reference speed, $w_{ref}$. The calculation of the filtered speed reference, $w_{ref\_filtered}$, is used to predict the steady state value of the integral state of the regulator 70 while the torque command, $T_{cmd}$, is saturated. The filtered speed reference, $w_{ref\_filtered}$, is utilized as an initial value of the integral state when the regulator 70 begins to operate in a linear range.

Figure 5:
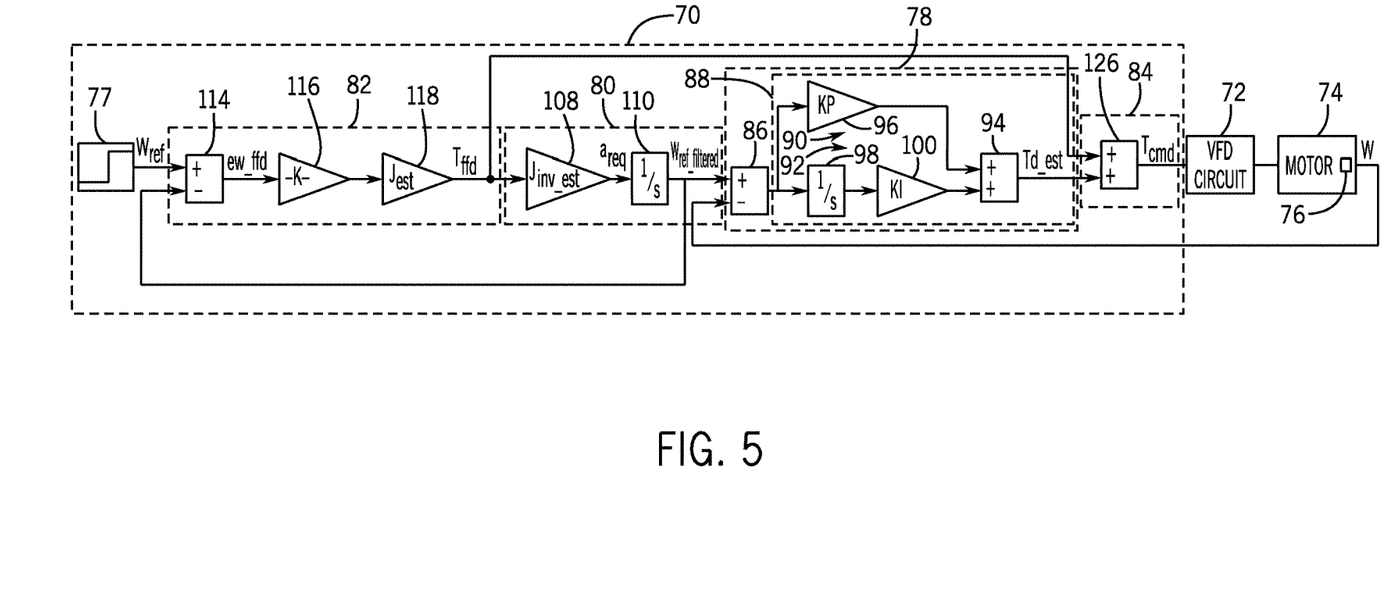
FIG. 5 is an equivalent block diagram of the regulator of FIG. 3 during linear operation, according to an embodiment of the invention.

Referring now to FIG. 5, an equivalent block diagram of the regulator 70 during linear operation is shown, according to an embodiment of the invention. The regulator 70, as shown in FIG. 5, operates in the same manner as shown and described above with respect to FIG. 4. FIG. 5 merely shows a simplified version of the block diagram of FIG. 4 that applies during linear operation of the motor 74. During linear operation of the motor 74, the torque output, $T_{out}$, is equal to the torque command, $T_{cmd}$. Therefore, the command module 84 may be represented by a summation block 126 that sums together the torque feedforward value, $T_{ffd}$, and the estimated motor torque load, $T_{d\_est}$. Since the saturation block 124 of the command module 84 may be omitted during linear operation, the observer 80 and the feedforward controller 82 together make a low-pass filter for the speed reference, $w_{ref}$, as multiplying the motor moment of inertia, $J_{est}$, by the inverse of the motor moment of inertia, $J_{inv\_est}$, just equals 1. The low-pass filter is defined by low-pass filter gain, K, of the gain block 116. In addition, the observer 80 may be simplified by removing the summation block 106. The observer 80 may be shown as receiving the torque feedforward value, $T_{ffd}$, instead of the torque command, $T_{cmd}$, and the estimated motor torque load, $T_{d\_est}$. During linear operation of the motor 74, the observer 80 may be represented as receiving only the torque feedforward value, $T_{ffd}$.

Figure 6:
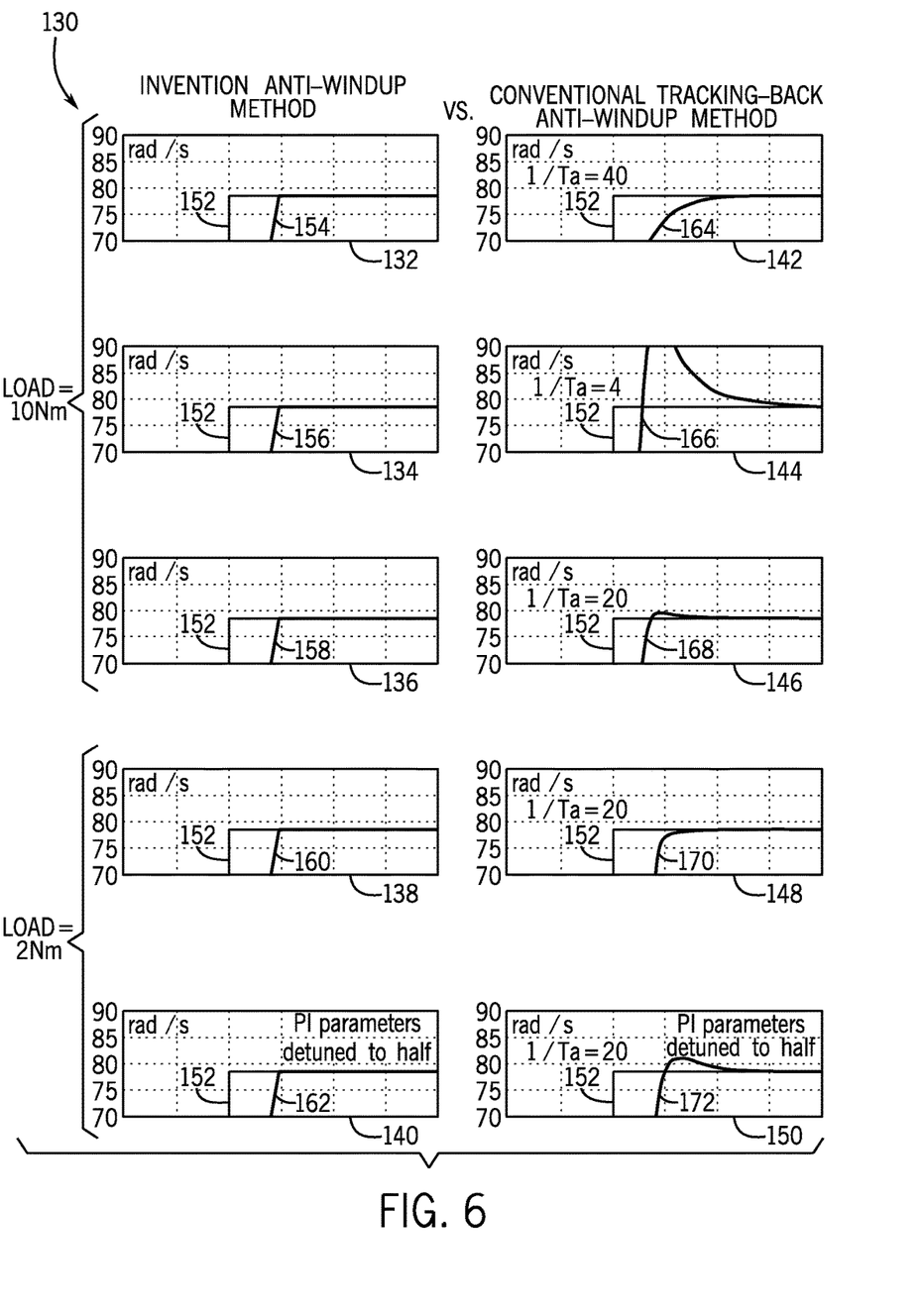
FIG. 6 is a chart illustrating a speed response comparison using the anti-windup method of the regulator of FIG. 4 and using the conventional tracking-back anti-windup method of FIG. 2.

Referring now to FIG. 6, a chart 130 comparing the speed response of a motor (not shown) using the anti-windup method of the regulator 70 (FIG. 4) and using the conventional tracking-back anti-windup method of the PID controller 26 (FIG. 2) is shown. The chart 130 includes five simulations 132, 134, 136, 138, 140 run using the anti-windup method of the regulator 70 and five simulations 142, 144, 146, 148, 150 run using the conventional tracking-back anti-windup method of PID controller 26 (FIG. 2). Each simulation 132-150 includes a speed reference curve 152. Each simulation 132-150 also includes a corresponding speed response curve 154, 156, 158, 160, 162, 164, 166, 168, 170, 172 showing the speed response of the motor for the invention and conventional anti-windup methods under different parameter settings and working conditions.

The inventive anti-windup simulations 132, 134, 136 and the conventional anti-windup simulations 142, 144, 146 illustrate simulations using a torque load value of 10 Nm on the motor. The conventional anti-windup simulations 142, 144, 146 were run with tracking time gains of 40, 4, and 20, respectively. As shown, the inventive anti-windup simulations 132, 134, 136 resulted in consistent speed response curves 154, 156, 158 that did not overshoot the speed reference curve 152. On the other hand, the speed reference curves 164, 166, 168 of the conventional anti-windup simulations 142, 144, 136 were not consistent. The speed curve 164 of conventional anti-windup simulation 142 was slow. The speed reference curve 166 of conventional anti-windup simulation 144 rose sharply, but overshot the speed reference curve 152 by a large margin. The speed reference curve 168 of conventional anti-windup simulation 146 rose sharply and overshot the speed reference curve 152, although by a much smaller margin.

The inventive anti-windup simulations 138, 140 and the conventional anti-windup simulations 148, 150 illustrate simulations using a torque load value of 2 Nm on the motor. The conventional anti-windup simulations 148, 150 were each run with a tracking time gain of 20. The inventive anti-windup simulation 140 and the conventional anti-windup simulation 150 used PI parameters (gains) that were tuned to half. As shown, the inventive anti-windup simulations 138, 140 resulted in speed response curves 160, 162 consistent with the speed response curves 154, 156, 158 of invention anti-windup simulations 132, 134, 136. Also, the speed response curves 160, 162 did not overshoot the speed reference curve 152. In contrast, the speed response curves 170, 172 of the conventional anti-windup simulations 148, 150 were not even consistent with the speed response curve 168 of the conventional anti-windup simulation 146, which included the same tracking time gain of 20. The speed response curve 170 illustrates a slower speed response than the speed response curve 168. The speed response curve 172 illustrates a slower speed response and a larger overshoot than the speed response curve 168.

Overall, the inventive anti-windup simulations 132, 134, 136, 138, 140 resulted in more consistent results than the conventional anti-windup simulations 142, 144, 146, 148, 150. The results of the inventive anti-windup simulations 132, 134, 136, 138, 140 were predictable and did not overshoot the speed response curve 152. The conventional anti-windup simulations 142, 144, 146, 148, 150 had inconsistent results, even when using the same tracking time gain. In addition, the speed response curves 166, 168, 172 of conventional anti-windup simulations 144, 146, 150 overshot the speed response curve 152. Therefore, the anti-windup method of the regulator 70 (FIG. 4) provides an improvement over the conventional tracking-back anti-windup method of the PID controller 26 (FIG. 2).

Figure 7:
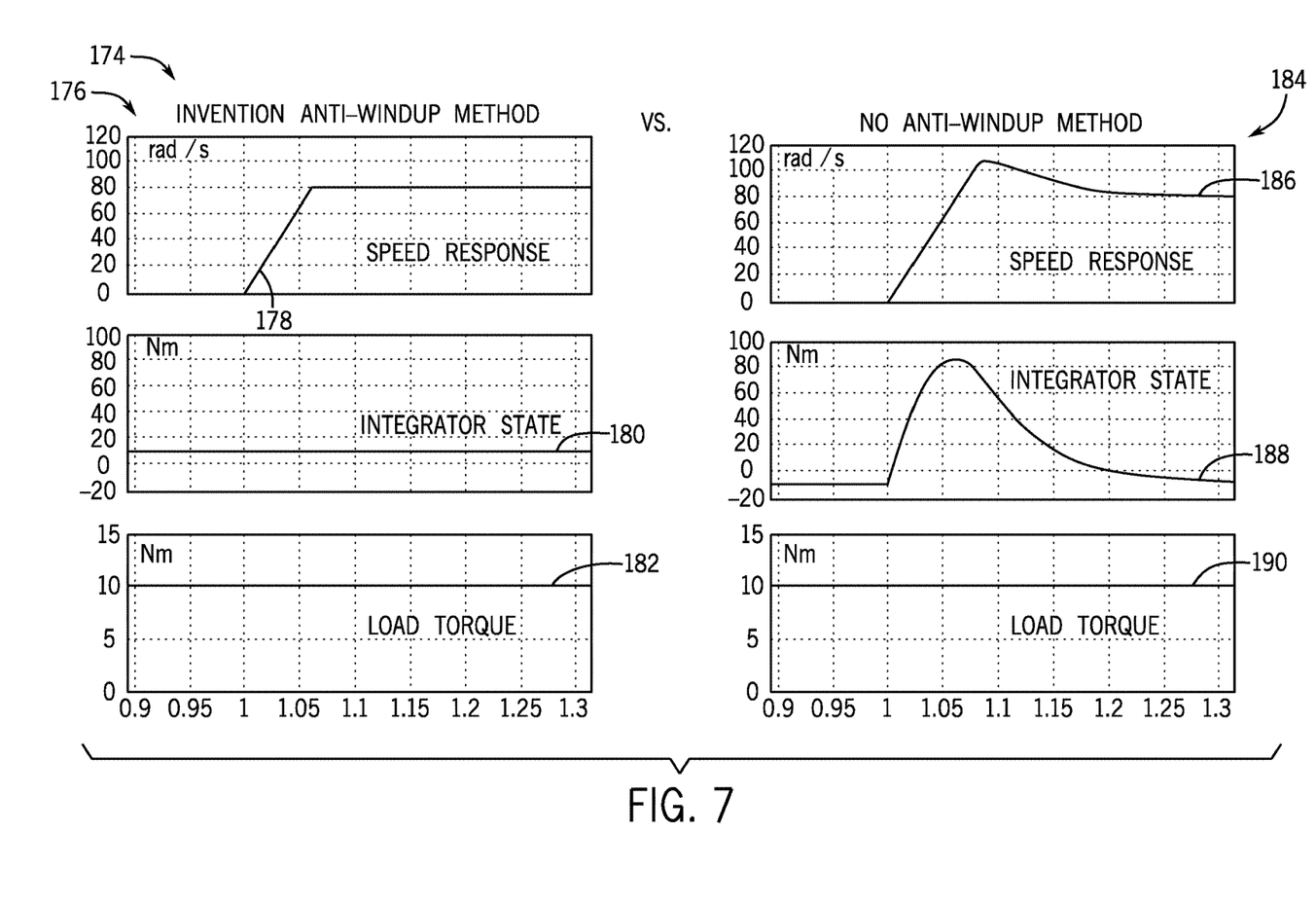
FIG. 7 is a chart illustrating a comparison of a speed response and an internal integrator state using the method of the regulator of FIG. 4 and using the no anti-windup method of FIG. 1.

Referring now to FIG. 7, a chart 174 comparing a speed response of a motor (not shown) and an internal integrator state using the method of the regulator 70 (FIG. 4) and using the no anti-windup method of the PID controller 10 (FIG. 1). The chart 174 includes an inventive anti-windup simulation 176 run using the method of the regulator 70 (FIG. 4). The inventive anti-windup simulation 176 includes a speed response curve 178, an integrator state curve 180, and a load torque curve 182. The chart 174 also includes a no anti-windup simulation 184 run using the method of the PID control 10 (FIG. 1). The no anti-windup simulation 184 includes a speed response curve 186, an integrator state curve 188, and a load torque curve 190. The load torque curves 182, 190 were both set to 10 Nm. As shown, the inventive anti-windup simulation 176 resulted in the speed response curve 178 steadily rising to the speed reference without overshooting it. The speed response curve 186 of the no anti-windup simulation 184, on the other hand, overshot the speed response curve and had to recover. In addition, the inventive anti-windup simulation 176 resulted in a steady integrator state curve 178. In contrast, the integrator state curve 188 of the no anti-windup simulation 184 increased dramatically upon startup and caused the overshoot in the speed response curve 186.

Figure 8:
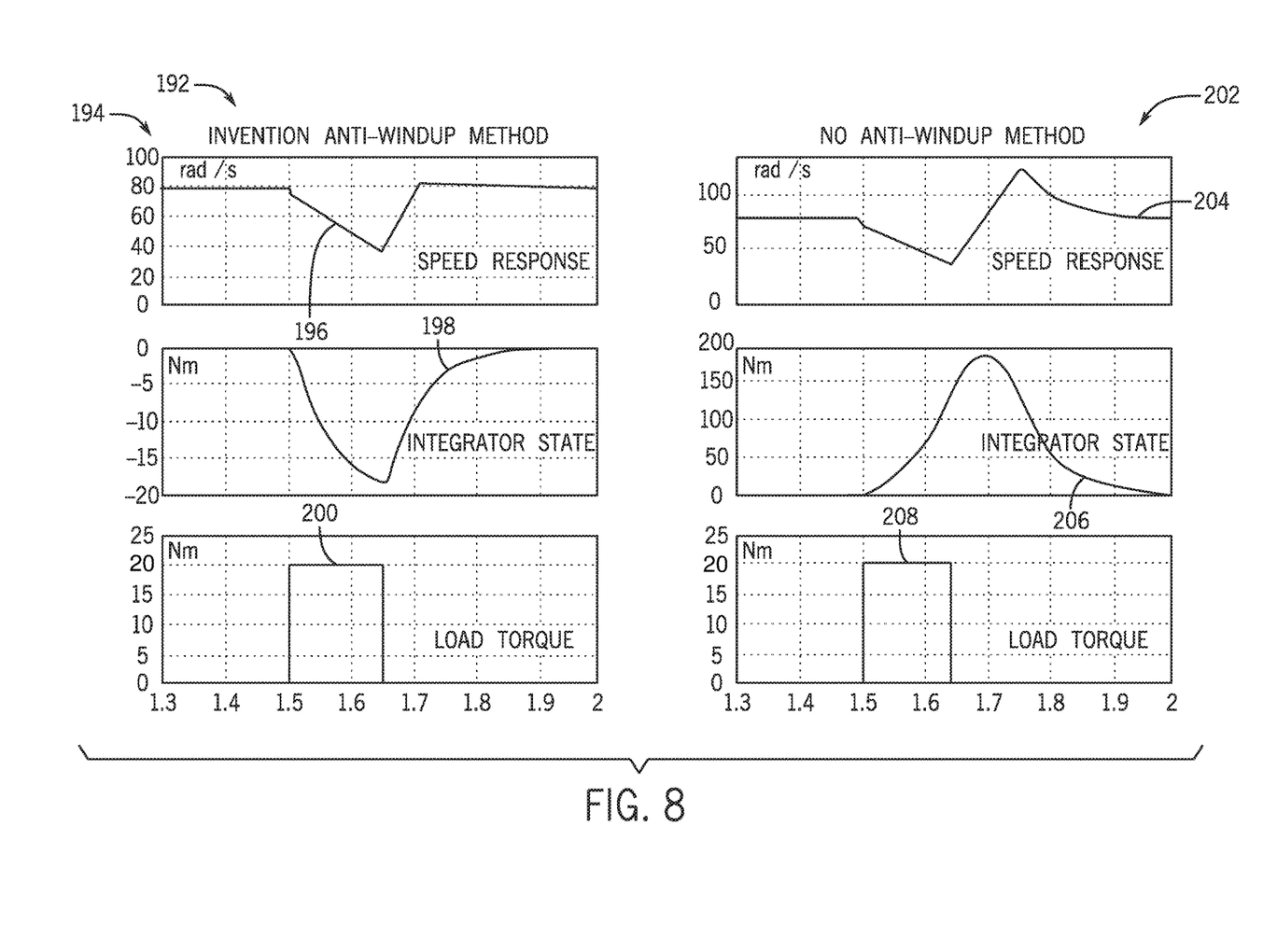
FIG. 8 is a chart illustrating a comparison of a speed recovery and an internal integrator state after load removal using the method of the regulator of FIG. 4 and using the no anti-windup method of FIG. 1.

Referring now to FIG. 8, a chart 192 comparing a speed response of a motor (not shown) and an internal integrator state after load removal using the method of the regulator 70 (FIG. 4) and using the no anti-windup method of the PID controller 10 (FIG. 1). The chart 192 includes an inventive anti-windup simulation 194 run using the method of the regulator 70 (FIG. 4). The inventive anti-windup simulation 194 includes a speed response curve 196, an integrator state curve 198, and a load torque curve 200. The chart 192 also includes a no anti-windup simulation 202 run using the method of the PID controller 10 (FIG. 1). The no anti-windup simulation 202 includes a speed response curve 204, an integrator state curve 206, and a load torque curve 208. The load torque curves 200, 208 were increased from 0 Nm to 20 Nm at 1.5 seconds until approximately 1.65 seconds, at which time the load torque curves 200, 208 were decreased back to 0 Nm.

Until 1.5 seconds, the speed of the motor in each of the speed response curves 196, 204 of the inventive anti-windup simulation 194 and the no anti-windup simulation 202, respectively, were operating at approximately 78 rad/s. While the load torque curves 200, 208 were increased to 20 Nm, both of the speed response curves 196, 204 decreased. Both of the speed response curve 196, 204 also increased after the load torque curves 200, 208 were decreased back to 0 Nm. However, the speed response curve 196 of the inventive anti-windup simulation 194 overshot the speed reference only slightly and immediately settled into the speed reference, while the speed response curve 204 of the no anti-windup simulation 202 overshot the speed reference by a large margin before settling back into the speed reference.

The integrator state curves 198, 206 of the inventive anti-windup method 194 and the no anti-windup simulation 202, respectively, had dramatically different behaviors. The integrator state curve 198 of the invention anti-windup method 194 decreased until the load torque curve 200 was dropped back to 0 Nm. The integrator state curve 198 then increased back to the original level. On the other hand, the integrator state curve 206 increased from when the load torque curve 208 was increased until 1.7 seconds, when the integrator state curve 198 began to decrease. The increase in the integrator state curve 206 caused the large overshoot of the speed response curve 204. Thus, the inventive anti-windup method of the regulator 70 (FIG. 4) provides a large improvement over the no anti-windup method of the PI controller 10 (FIG. 1).

Beneficially, embodiments of the invention thus provide a system and method of speed regulation for VFD circuits where an anti-windup control scheme is employed that provides consistent motor speed response with no overshoot of the speed reference. A regulator outputs a torque command to a VFD circuit for operating a motor electrically coupled thereto. The torque command is calculated using a torque command module that receives input a torque feedback value from a feedforward controller and an estimated torque load of the motor from a feedback controller. The feedforward controller calculates the torque feedforward value based on a speed reference and a filtered speed reference. The feedback controller calculates the estimated motor torque load based on the actual speed of the motor and the filtered speed reference. The filtered speed reference is calculated in an observer based on the torque command and the estimated motor torque load. Hence, the filtered speed reference is calculated from an initial torque command and is used to modify that initial torque command to create a modified torque command. The regulator provides an improvement over the prior art by predicting the steady-state value of its integral state using the filtered speed reference during saturation of the motor. That steady-state value is used as an initial value of the integral state of the regulator when the regulator beings to operate in linear range. The operation of the regulator thus provides consistent speed response against various load conditions and parameter changes over conventional anti-windup schemes.

A technical contribution for the disclosed method and apparatus is that it provides for a controller implemented technique for regulating speed for VFD circuits where an anti-windup control scheme is employed that provides consistent motor speed response with no overshoot of the speed reference.

According to one embodiment of the present invention, a control system for operating a VFD circuit that controls a motor includes a feedback controller programmed to receive a speed of the motor operating responsive to an initial torque command and process the speed of the motor to generate a feedback controller output, a feedforward controller programmed to process a speed reference to generate a feedforward controller output, and a command module programmed to determine a torque command based on the processed outputs of the feedback and feedforward controllers and operate the VFD circuit to control the motor according to the torque command.

According to another embodiment of the present invention, a method of controlling a VFD circuit via a control system comprising a feedforward controller and a feedback controller is provided. The method includes measuring or estimating a motor speed of a motor being controlled by the VFD circuit according to an introductory torque command, providing an input to the feedback controller comprising the motor speed, introducing a speed reference input in the feedforward controller, modifying the motor speed input in the feedback controller to generate a modified feedback controller output, modifying the speed reference input in the feedforward controller to generate a modified feedforward controller output, calculating an updated torque command based on the modified outputs of the feedback and feedforward controllers, and controlling the VFD circuit to supply power to the motor based on the torque command.

According to yet another embodiment of the present invention, a regulator for controlling the output of a VFD circuit is programmed to sense or estimate a motor speed of a motor driven by the VFD circuit according to an initial torque command, receive a speed reference value, filter the speed reference value, manipulate the motor speed in a feedback controller according to the filtered speed reference value, manipulate the speed reference value in a feedforward controller according to the filtered speed reference value, determine a modified torque command value according to the manipulated motor speed and manipulated speed reference value, and control the VFD circuit to drive the motor in conformance with the modified torque command value.

The present invention has been described in terms of the preferred embodiment, and it is recognized that equivalents, alternatives, and modifications, aside from those expressly stated, are possible and within the scope of the appending claims.

What is claimed is:

1. A control system for operating a variable frequency drive (VFD) circuit that controls a motor, the control system comprising:
   an observer programmed to calculate a filtered speed reference based on an initial torque command;
   a feedback controller programmed to:
      receive a speed of the motor operating responsive to the initial torque command; and
      process the speed of the motor to generate a feedback controller output;
   a feedforward controller programmed to process a speed reference and the filtered speed reference to generate a feedforward controller output; and
   a command module programmed to:
      determine a torque command based on the processed outputs of the feedback and feedforward controllers; and
      operate the VFD circuit to control the motor according to the torque command.

2. The control system of claim 1 wherein the observer is further programmed to:
   receive the feedback controller output; and
   calculate the filtered speed reference based on the feedback controller output.

3. The control system of claim 1 wherein the feedback controller is programmed to process the speed of the motor by:
   calculating a feedback speed error signal by subtracting the filtered speed reference from the speed of the motor;
   calculating an estimated torque load of the motor by processing the speed error signal.

4. The control system of claim 3 wherein the feedback controller is programmed to process the feedback speed error signal in a proportional-integral controller.

5. The control system of claim 1 wherein the feedforward controller is programmed to process the speed reference by:
   calculating a feedforward speed error signal by subtracting the filtered speed reference from the speed reference; and
   calculating a torque feedforward signal by converting the feedforward speed error signal.

6. The control system of claim 5 wherein the feedforward controller is programmed to convert the feedforward speed error signal into the torque feedforward signal by:
   passing the feedforward speed error signal through a low-pass filter; and
   multiplying the filtered feedforward speed error signal by an estimated moment of inertia of the motor.

7. The control system of claim 1 wherein the command module is further programmed to limit the torque command based on limitations of the motor.

8. The control system of claim 1 wherein the command module is further programmed to convert the modified torque command to a current command for operating the VFD circuit.

9. A method of controlling a variable frequency drive (VFD) circuit via a control system comprising a feedforward controller and a feedback controller, the method comprising:
   measuring or estimating a motor speed of a motor being controlled by the VFD circuit according to an introductory torque command;

providing an input to the feedback controller comprising the motor speed;

introducing a speed reference input in the feedforward controller;

modifying the motor speed input in the feedback controller to generate a modified feedback controller output;

modifying the speed reference input in the feedforward controller to generate a modified feedforward controller output;

calculating an updated torque command based on the modified outputs of the feedback and feedforward controllers; and controlling the VFD circuit to supply power to the motor based on the torque command.

10. The method of claim 9 further comprising filtering the speed reference using the introductory torque command.

11. The method of claim 10 wherein modifying the motor speed in the feedback controller comprises:

calculating a feedback speed error value based on the filtered speed reference and the motor speed;

calculating a future torque load of the motor by manipulating the feedback speed error value in a proportional-integral controller.

12. The method of claim 10 wherein modifying the speed reference input in the feedforward controller comprises:

calculating a feedforward speed error value based on the filtered speed reference and the speed reference; and transforming the feedforward speed error value into a torque feedforward value.

13. The method of claim 12 wherein transforming the feedforward speed error value into the torque feedforward value comprises:

filtering the feedforward speed error value; and computing the torque feedforward value based on the filtered feedforward speed error and an estimated moment of inertia of the motor.

14. The method of claim 9 further comprising transforming the torque command into a current command for controlling the VFD circuit.

15. The method of claim 9 further comprising saturating the updated torque command according to a saturation point of the motor, so as to limit a value of the updated torque command.

16. A regulator for controlling the output of a variable frequency drive (VFD) circuit, the regulator programmed to:

sense or estimate a motor speed of a motor driven by the VFD circuit according to an initial torque command;

receive a speed reference value;

filter the speed reference value;

manipulate the motor speed in a feedback controller according to the filtered speed reference value;

manipulate the speed reference value in a feedforward controller according to the filtered speed reference value;

determine a modified torque command value according to the manipulated motor speed and manipulated speed reference value; and control the VFD circuit to drive the motor in conformance with the modified torque command value.

17. The regulator of claim 16 wherein the regulator filters the speed reference value using the initial torque command value.

18. The regulator of claim 16 wherein the regulator manipulates the motor speed in the feedback controller by:

reducing the motor speed by the filtered speed reference value; and processing the reduced motor speed in a proportional-integral controller.

19. The regulator of claim 16 wherein the regulator manipulates the speed reference value in the feedforward controller by:

reducing the speed reference value by the filtered speed reference value;

filtering the reduced speed reference value in a low-pass filter; and adjusting the filtered reduced speed reference value according to an estimated moment of inertia of the motor.

20. The regulator of claim 16 where the regulator is further programmed to convert the modified torque command value into a current command value for controlling the VFD circuit.

* * * * *

UNITED STATES PATENT AND TRADEMARK OFFICE
CERTIFICATE OF CORRECTION

PATENT NO. : 10,333,455 B2  
APPLICATION NO. : 15/085446  
DATED : June 25, 2019  
INVENTOR(S) : Cheng et al.

Page 1 of 1

It is certified that error appears in the above-identified patent and that said Letters Patent is hereby corrected as shown below:

On the Title Page (72) Inventors: delete "Menomonee Falls, MI (US)" and substitute therefore -- Menomonee Falls, WI (US) --.

Signed and Sealed this
Seventeenth Day of September, 2019

Andrei Iancu
*Director of the United States Patent and Trademark Office*